Sept. 25, 1928.
H. J. MURPHY
1,685,408
LUBRICANT EXPELLING DEVICE
Filed Feb. 11, 1925
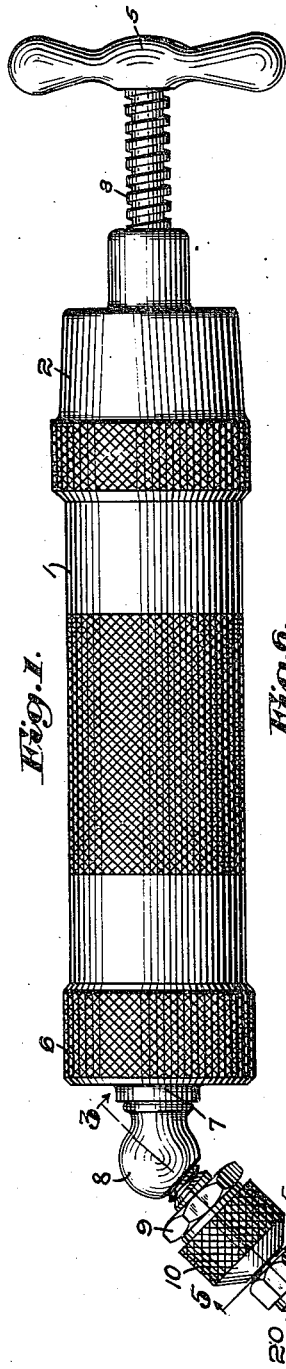
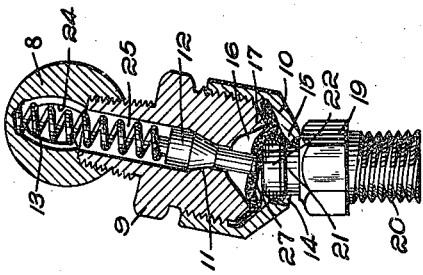
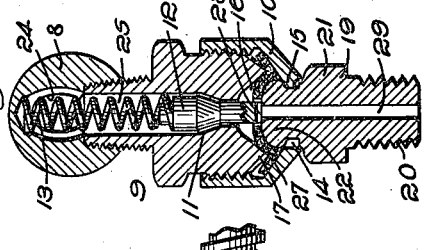
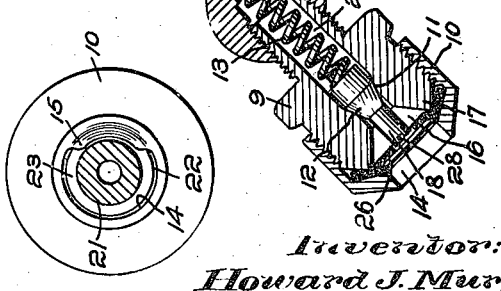
Inventor:
Howard J. Murphy.

Patented Sept. 25, 1928.

1,685,408

UNITED STATES PATENT OFFICE.

HOWARD J. MURPHY, OF READING, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

LUBRICANT-EXPELLING DEVICE.

Application filed February 11, 1925. Serial No. 8,588.

This invention aims to provide an improved lubricant-expelling device.

In the drawings, which illustrate a preferred form of my invention:—

Figure 1 is a side elevation of a lubricant-expelling gun shown secured to a cooperating lubricant-receiving nipple;

Fig. 2 is a longitudinal section through the nozzle and a portion of the barrel, being partly in elevation;

Fig. 3 is a section on the line 3—3 of Fig.1, being partly in elevation and showing the valve open to permit passage of lubricant to the lubricant-receiving nipple;

Fig. 4 is a section similar to Fig. 3, but showing the relation of the nozzle to the lubricant-receiving nipple prior to opening of the valve;

Fig. 5 is a somewhat enlarged section on the line 5—5 of Fig. 1; and

Fig. 6 includes a rear, side and front elevation of a preferred form of lubricant-receiving nipple.

The form of my invention as illustrated and more fully hereinafter described, is decidedly advantageous over other known constructions of lubricant-expelling devices wherein the nozzle of the device is passed over the head of the nipple without any coupling whatever. When no actual coupling takes place, the strength of the operator is relied upon to discharge lubricant under pressure and maintain a tight seal between the nipple and the lubricant-expelling device. My invention includes a so-called hook-over connection between the device and the nipple, which is very efficient and simple in operation. One of the advantages of the hook-over connection over the push connection is that it is possible to hook the nozzle over a nipple which projects at nearly any angle relative to the part to be lubricated, whereas in other known types of devices the nipples must all be so arranged that they will be in a line with the axis of the barrel of the device. The cooperation between the angle of the nozzle and the relation of the lip relative to the torque exerted upon the handle of the device is also important. Because of their cooperation, lubricant may be expelled under great pressure without fear of leakage around the sealing washer. Also no great amount of exertion is required to operate the device.

I will now describe in detail the preferred form of my invention.

Referring to the drawings and to the preferred form of my invention, I have shown the usual barrel 1, rear head 2, into which is threaded a plunger stem 3 carrying the usual plunger 4 (Fig. 2) for forcing lubricant from the barrel, and a handle 5. At the front end of the barrel, I have shown a front head 6 threadedly secured to the barrel 1 in the usual way. The preferred form of front head is provided with a boss 7 into which is screwed the end of a nozzle-carrying part 8. The nozzle includes a valve-carrying part 9 threaded into the part 8 at approximately a ninety degrees angle relative to the axis of the barrel 1 and a coupling part or sleeve 10 threadedly secured to the valve-carrying part 9. The purposes of the angular relation of the parts will be more fully hereinafter described.

The valve-carrying part 9 presents a seat 11 for a closure valve 12 normally urged against its seat by a spring 13 seated at one end in the nozzle-carrying part 8. The coupling sleeve 10 has an opening or recess 14 at the front end thereof, which is intersected by a shoulder or lip 15, the purposes of which will be more fully hereinafter described.

Between the valve-carrying part 9 and the sloping inner face of the coupling sleeve 10, I have provided a flexible sealing washer 16, held in place between the tapered end 17 of the valve-carrying part and the sloping inner face of the coupling sleeve as illustrated in Fig. 2. The closure valve is preferably provided with a forwardly extending projecting part 18 which normally passes partly through the sealing washer, as illustrated in Figs. 2 and 4.

The lubricant-receiving nipple, as illustrated in Figs. 3, 4 and 6, includes a flat sided wrench-receiving central portion 19, a threaded portion 20 at one side thereof for securing the nipple to its support and at the other side a reduced neck 21 and a flattened head portion 22 rounded at its periphery.

Coupling of the nozzle with the nipple is easily and quickly effected by grasping the handle 5 of the device and tipping the nozzle relative to the axis of the nipple, so that the head 22 thereof may pass into the recess 14 in the end of the coupling sleeve 10 and allow the lip 15 to pass beneath the head 22 and engage the shoulder 23 between the neck and head of the nipple, as best illustrated in Fig. 4. Then, by turning the handle in a clockwise direction, the torque produced thereby will tip the nozzle about the pivot provided between the lip 15 and shoulder 23 until it is aligned with the axis of the nipple, as best shown in Fig. 3. This action can take place when turning the handle because of the angular relation of the nozzle to the barrel of the device and because the lip is hooked under that side of the nipple away from the direction of strain, as best shown in Fig. 5.

While the above-mentioned tipping action is taking place, the projecting end 16 of the valve 12 contacts with the head 22 of the nipple and further tipping forces the closure valve 12 open against the pressure of the spring 13 to permit passage of lubricant into the lubricant-receiving nipple.

During the valve opening operation, the sealing washer 16 contacts with the head 22 of the nipple and is pressed tightly thereagainst by lubricant which rushes past the valve as soon as opened. Further rotation of the handle 5 in a clockwise direction forces the lubricant from the barrel through a passage 24 in the nozzle-carrying part 8, through a passage 25, connecting the passage 24 with the chamber 26 which is provided back of the flexible sealing washer 16. The lubricant then passes from the chamber 26 through an aperture 27 in the sealing washer 16, through which the end 18 of the closure valve projects, through a slot 28 cut in the end of the projecting part 18 to the passage 29 in the lubricant-receiving nipple.

If the nozzle were placed in line with the axis of the gun, there would be a tendency of the whole nozzle to rotate about the lubricant-receiving nipple and there would not be any effective pressure caused by the torque of the gun to help greatly in producing an efficient seal. Therefore, the angle of the nozzle in relation to the barrel of the device is important and the relation of the lip to the direction of rotation of the handle is important in producing an efficient seal between the nipple and the nozzle.

The lubricant expelled may, if desired, be under relatively great pressure, but no substantial leakage is possible because the pressure on the sealing washer holds the latter in such close contact with the rounded head of the nipple as to preclude leakage. The greater the torque on the handle 5, the greater will be the pressure exerted between the nozzle of the device and the nipple.

Disengagement of the device from the nipple is effected by a slight counterclockwise pressure exerted upon the handle which overbalances the nozzle with relation to the nipple, thereby permitting the valve to close and the nozzle then tips off of the head of the nipple and the lip becomes disengaged from the shoulder.

If desirable, the operator may use both hands in securing the device to the nipple. First taking the device by the barrel with one hand and hooking it over and aligning the nozzle with the axis of the nipple by torque on the barrel, with the other hand the operator may turn the handle to expel lubricant from the barrel. However, the first described means of operation is simpler and preferable.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims.

1. Lubricating apparatus comprising, in combination, a lubricant-receiving part presenting a shoulder thereon, a lubricant-expelling gun including coupling means for engagement over said shoulder and lubricant expelling means including a handle whereby lubricant may be forced from said gun to said lubricant-receiving part, said coupling means adapted to tip about said shoulder when torque is applied to said handle thereby to open said valve and permit passage of lubricant from said gun to said lubricant-receiving part.

2. Lubricating apparatus comprising, in combination, a lubricant-receiving nipple presenting a shoulder thereon, a lubricant-expelling gun including a barrel, a handle, a piston operable by rotation of said handle to force lubricant from said barrel, and a nozzle presenting a lip adapted to be hooked over said shoulder, the axis of said nozzle at an angle relative to the axis of said barrel, said angle being such that torque on said handle causes said lip to hook under said shoulder while opposing any axial rotation of said nozzle relative to said nipple.

3. A lubricant-expelling device comprising, in combination, a barrel, means for expelling lubricant from said barrel, a handle for operating said expelling means, a discharge conduit fixed to said barrel, a nozzle beyond said conduit, an aperture to permit passage of said nozzle over the head of a lubricant-receiving nipple and a lip for engagement with said nipple, said lip located at that side of said aperture away from the direction of rotation of said handle when said lubricant is being forced from said barrel, said nozzle located at an angle relative to said barrel to prevent rotation of said lip relative to said nipple thereby permitting a tipping action of said nozzle to effect a tight seal between said nozzle and said nipple.

4. A lubricant-expelling device for cooperation with a lubricant-receiving nipple presenting a head and a shoulder back of said head, said device including a nozzle presenting a nipple-receiving opening surrounded by a continuous wall providing an aperture having a projection extending inwardly at one side thereof, the distance between the free edge of said projection and the opposite side of the wall being less than the diameter of the head of the nipple, thereby necessitating tipping of the nozzle over the nipple to make a connection therewith.

5. A lubricating apparatus comprising in combination, a lubricant-receiving part having a shoulder, a nozzle for engagement with said lubricant-receiving part, said nozzle including a sealing washer, a closure valve having a stem extending into adjacency to said sealing washer, and a lip located beyond and at one side of said stem, said lip adapted to engage behind one side of said shoulder of said lubricant receiving part whereby a tipping action of said nozzle relative to said lubricant-receiving part about said lip as a fulcrum will cause the end of said lubricant-receiving part to engage said stem to open said valve and whereby said washer will be pressed by the lubricant released through said valve against the head of the lubricant-receiving part to provide a tight seal between said nozzle and said lubricant-receiving part.

6. Lubricating apparatus comprising, in combination, a lubricant-receiving part having a shoulder, a nozzle for engagement with said lubricant-receiving part, said nozzle including a sealing washer, a spring-pressed closure valve having a stem extending into adjacency to said sealing washer, and a lip located beyond and at one side of said stem, said lip adapted to engage behind one side of said shoulder of said lubricant-receiving part whereby a tipping action of said nozzle relative to said lubricant-receiving part about said lip as a fulcrum will cause the end of said lubricant-receiving part to engage said stem to open said valve and whereby said washer will be pressed by the lubricant released through said valve against the head of the lubricant-receiving part to provide a tight seal between said nozzle and said lubricant-receiving part.

7. A lubricant expelling device for cooperation with a lubricant receiving nipple having a head and a shoulder back of said head, said device including a nozzle presenting a closure valve, a lip intersecting one side of a nipple receiving opening in said nozzle for engagement back of said shoulder on said nipple at one side only to permit the nozzle to tip into and out of coupling engagement with the nipple, a sealing washer for engagement with the head of said nipple, said closure valve actuated by the head of said nipple to permit the passage of lubricant from said nozzle to said lubricant receiving nipple, and lubricant expelling means for holding said nozzle and nipple in coupled relation.

8. A lubricant expelling device for cooperation with a lubricant receiving nipple presenting a head and a shoulder back of said head, said device including a nozzle presenting a coupling and a part presenting a valve seat, a lubricant pressed sealing washer between said coupling part and valve seat part for making a lubricant tight seal against the head of the nipple, and means carried by said coupling part for engagement back of a portion of said shoulder at one side only.

9. A lubricant expelling device in combination with a lubricant receiving nipple having a shoulder and a rounded contact end, said device including a nozzle presenting a part for engagement behind said shoulder and one side of said nipple only, and a lubricant pressed sealing disc adapted to receive and conform to the rounded end of said nipple, said sealing disc having an edge firmly clamped in said nozzle and a central part having an aperture adapted to register with the inlet opening in said nipple, a barrel including means for forcing lubricant from said barrel to said nipple, said nozzle and said barrel being rigidly connected so that movement of said barrel in one direction effects a sealed connection between said nipple and nozzle and movement in a second direction effects disconnection thereof and means associated with said barrel for discharging lubricant therefrom at high pressure.

In testimony whereof, I have signed my name to this specification.

HOWARD J. MURPHY.